(12) United States Patent
Voronkov et al.

(10) Patent No.: US 11,126,592 B2
(45) Date of Patent: Sep. 21, 2021

(54) RAPID INDEXING OF DOCUMENT TAGS (71) Applicant: Microsoft Corporation, Redmond, WA (US)

(72) Inventors: Nikita Voronkov, Bothell, WA (US); Dmitriy Meyerzon, Bellevue, WA (US); Yauhen Shnitko, Redmond, WA (US); Aninda Ray, Bellevue, WA (US); Manfred Berry, Tromso (NO); Kjetil Bergstrand, Tromso (NO); Johannes Gehrke, Tromso (NO); Eirik Knutsen, Tromso (NO)

(73) Assignee: Microsoft Technology Licensing, LLC, Redmond, WA (US)

(*) Notice: Subject to any disclaimer, the term of this patent is extended or adjusted under 35 U.S.C. 154(b) by 1096 days.

(21) Appl. No.: 14/475,463

(22) Filed: Sep. 2, 2014

(65) Prior Publication Data

US 2016/0063022 A1    Mar. 3, 2016

(51) Int. Cl.
*G06N 7/00*    (2006.01)
*G06F 16/16*   (2019.01)
*G06F 16/22*   (2019.01)
*G06F 16/901*  (2019.01)
*G06F 16/93*   (2019.01)

(52) U.S. Cl.
CPC ........ *G06F 16/162* (2019.01); *G06F 16/2228* (2019.01); *G06F 16/9024* (2019.01); *G06F 16/93* (2019.01)

(58) Field of Classification Search
CPC ........... G06F 17/2247; G06F 17/30896; G06F 17/2235; G06F 17/30882; G06F 17/3089

USPC ................................................ 715/205, 234
See application file for complete search history.

(56) References Cited

U.S. PATENT DOCUMENTS

| | | | |
|---|---|---|---|
| 7,069,505 B2 | 6/2006 | Tamano | |
| 7,266,539 B2 | 9/2007 | Berks et al. | |
| 7,636,732 B1* | 12/2009 | Nielsen | G06F 17/3064 |
| 8,136,025 B1 | 3/2012 | Zhu et al. | |
| 8,775,517 B1* | 7/2014 | Goldman | G06Q 50/01 |
| | | | 705/319 |
| 2007/0033221 A1* | 2/2007 | Copperman | G06F 17/30616 |
| 2008/0162777 A1* | 7/2008 | Kaiser | G06F 16/9024 |
| | | | 711/100 |
| 2008/0288442 A1 | 11/2008 | Feigenbaum et al. | |
| 2009/0222759 A1 | 9/2009 | Drieschner | |
| 2010/0169324 A1 | 7/2010 | Shnitko et al. | |

(Continued)

FOREIGN PATENT DOCUMENTS

EP    2192503 A1    6/2010

OTHER PUBLICATIONS

Hassan-Montero, et al., "Improving Tag-Clouds as Visual Information Retrieval Interfaces", In Proceedings of International Conference on Multidisciplinary Information Sciences and Technologies, Oct. 25, 2006, 6 pages.

(Continued)

*Primary Examiner* — Hassan Mrabi
(74) *Attorney, Agent, or Firm* — Liang IP, PLLC (57) ABSTRACT

Document tags are rapidly indexed using a text based index and a graph index. A tag signal is received. A tag and a type of the tag that are located in the tag signal are stored in a data store. The tag is indexed as a tag document in the text based index. One or more relationships between the tag and a content document are managed in the graph index.

20 Claims, 7 Drawing Sheets

(56) References Cited

U.S. PATENT DOCUMENTS

| | | | |
|---|---|---|---|
| 2010/0281030 A1* | 11/2010 | Kusumura | G06F 17/30616 |
| | | | 707/741 |
| 2011/0067087 A1 | 3/2011 | Thornton et al. | |
| 2011/0125760 A1* | 5/2011 | Frieden | G06F 17/30864 |
| | | | 707/748 |
| 2012/0167007 A1* | 6/2012 | Ross | G06Q 10/10 |
| | | | 715/811 |
| 2012/0179696 A1 | 7/2012 | Charlot et al. | |
| 2013/0159306 A1 | 6/2013 | Janssen et al. | |
| 2014/0040275 A1 | 2/2014 | Dang et al. | |
| 2016/0026713 A1* | 1/2016 | Katie | G06F 17/3053 |
| | | | 707/709 |

OTHER PUBLICATIONS

Kerr, Bernard, "TagOrbitals: A Tag Index Visualisation", In IBM Research Report RC 24027 (W0608-056), Aug. 14, 2006, 4 pages.

"International Search Report & Written Opinion Issued in PCT Application No. PCT/US2015/046841", dated Oct. 26, 2015, 11 Pages.

"Second Written Opinion Issued in PCT Application No. PCT/US2015/046841", dated Aug. 4, 2016, 7 Pages.

* cited by examiner

RAPID INDEXING OF DOCUMENT TAGS

BACKGROUND

Search engines discover and store information about documents such as web pages, documents of different formats, etc., which they typically retrieve from the textual content of the documents. The documents are sometimes retrieved by a crawler or an automated browser, which may follow links in a document or on a website. Conventional crawlers typically analyze documents as flat text files examining words and their positions (e.g. titles, headings, or special fields), and build inverted indexes that are optimized for queries but can be very hard to update. Data about analyzed documents may be stored in an index database for use in later search queries. A query may include a single word or a combination of words and/or metadata.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to rapidly indexing document tags. In some example embodiments, a search service may receive a tag signal. A tag and a type of the tag may be located in the tag signal. The tag and the type may be stored in a data store. The tag may be indexed as a tag document within a text based index. One or more relationships between the tag and a content document may be managed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, document tags may be rapidly indexed by a search service. A tag signal may be received by the search service. A tag and a type of the tag that are located in the tag signal may be stored in a data store. The tag may be indexed as a tag document in a text based index. One or more relationships between the tag and a content document may be managed in a graph index as one or more edges.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to rapidly index document tags. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
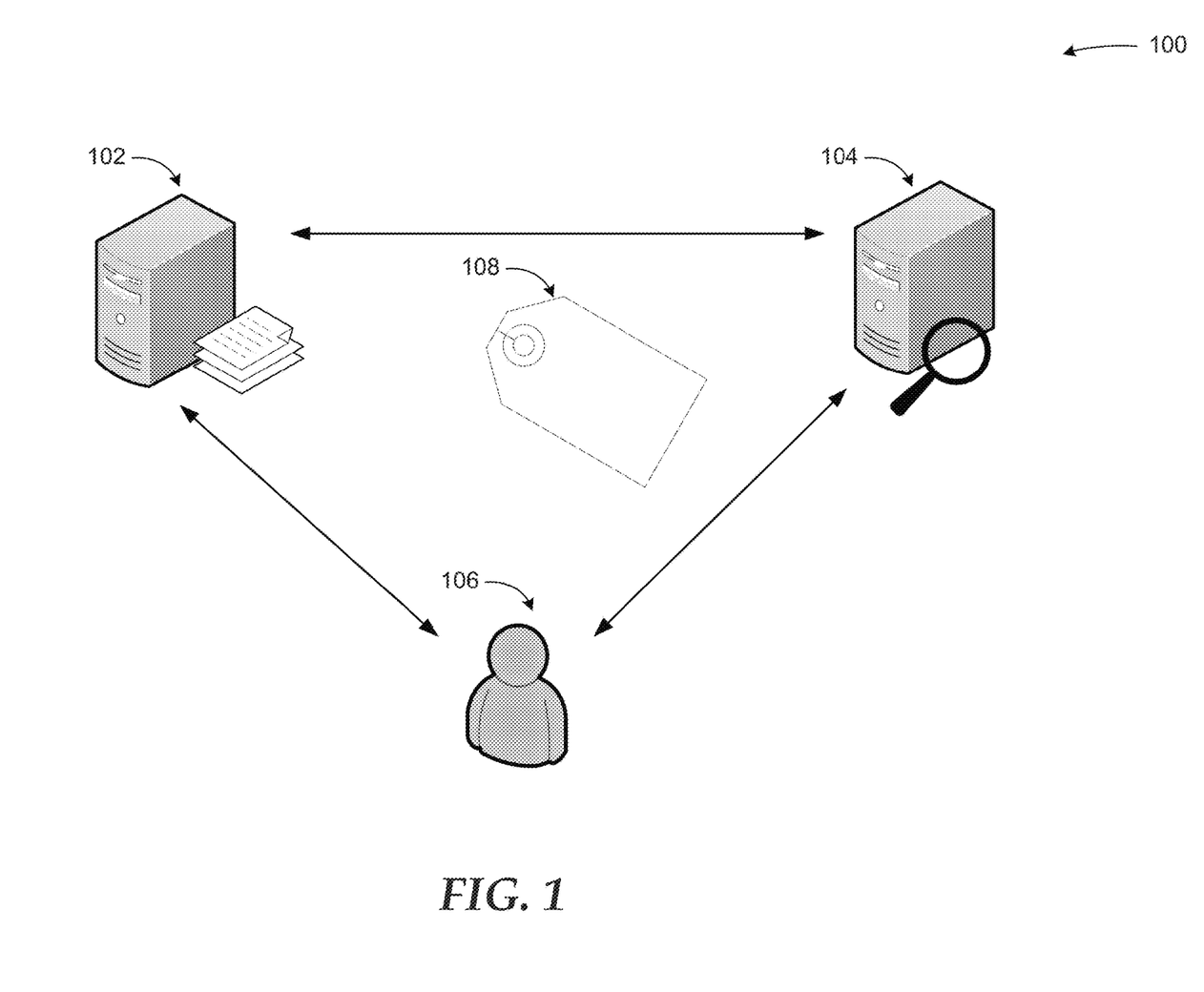
FIG. 1 is a conceptual diagram illustrating components of a scheme to rapidly index document tags, according to embodiments.

FIG. 1 is a conceptual diagram illustrating components of a scheme to rapidly index document tags, according to embodiments.

In a diagram 100, a search service may index a document with a tag 108. A search server 104 may execute the search service. The search service may be a stand-alone application or a distributed application that provides one or more search functions associated with content such as documents. The search functions may include search operations of documents, indexing operations of documents, among others. The search server 104 may include one or more computing devices. An example of the search service may be a cloud based service that executes on one or more servers such as the server 104 connected through a network with wired and/or wireless components.

The search service may access one or more documents on a document server 102. The document server 102 may be a data store that provides access the documents. The document server 102 may be located locally in relation to the search server 104 which may include the document server 102 situated within a network shared by the search server 104. Alternatively, the document server 102 may be located remotely in relation to the search server 104 which may include the document server 102 situated outside a network associated with the search server 104. The documents may also be stored within a computing device shared by the search service such as the search server 104.

A user 106 may interact with the search service to annotate documents that may be stored by the document server 102. The user may provide a tag 108 to annotate a document. The tag 108 may include an identifier for the document. An example of a tag may include a title, a categorization, a type, a label, an identification, a related document, a name of the team or organization, a general topic, among others. The search service may index the document with the tag 108 at a text based index and a relationship between the tag 108 and the document at a graph index.

While the example system in FIG. 1 has been described with specific components including the search server 104, the document server 102, the tag 108, embodiments are not limited to these components or system configurations and can be implemented with other system configuration employing fewer or additional components.

Figure 2:
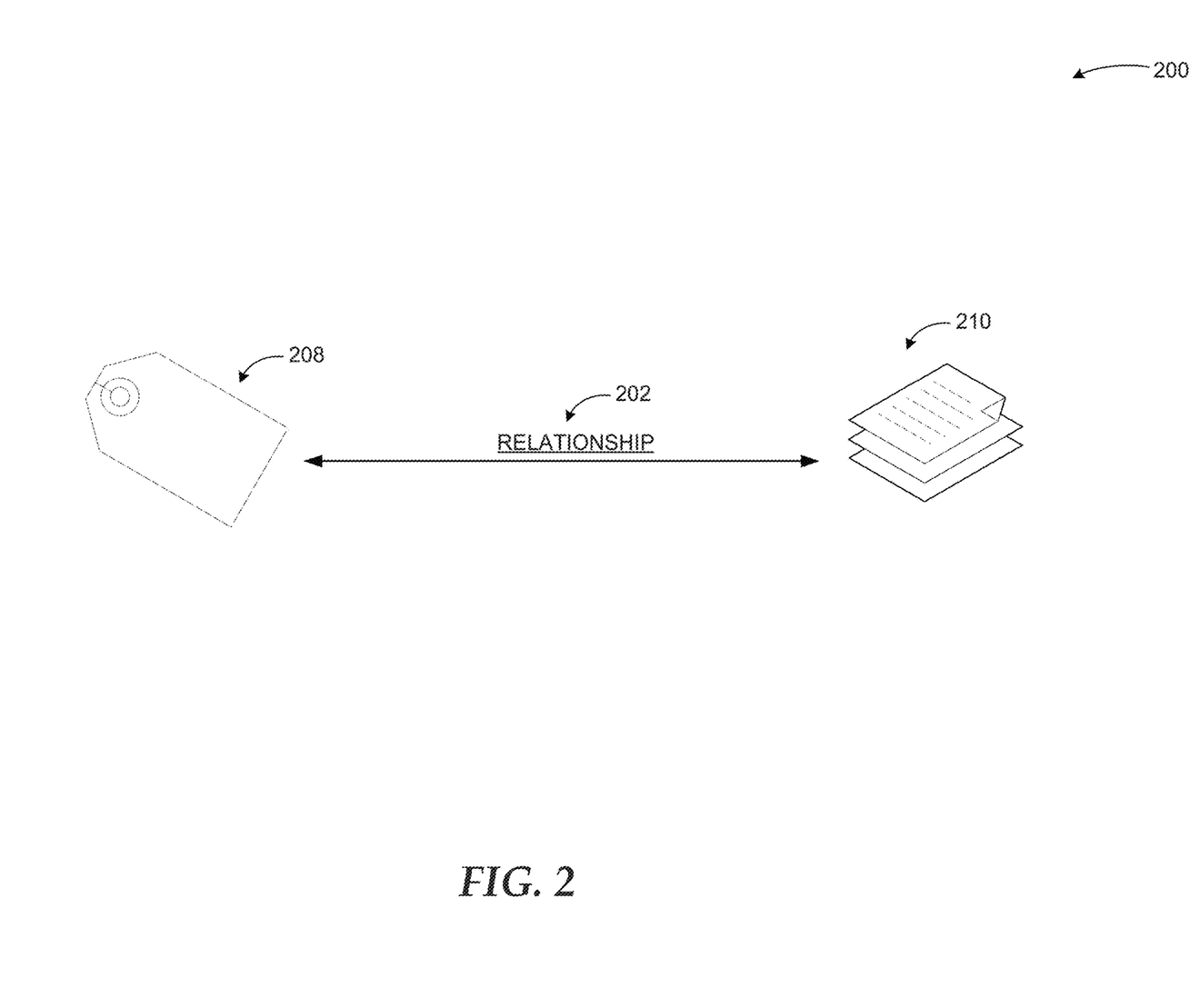
FIG. 2 illustrates rapid indexing of a document with a tag to establish a relationship, according to embodiments.

FIG. 2 illustrates rapid indexing of a document with a tag to establish a relationship, according to embodiments.

In a diagram 200, a tag 208 may be used to annotate a document 210. The tag may provide an identifier associated with the document 210. An example may include a title, search terms, a description, a creation timestamp, a last modified timestamp, among others. Associating the tag 208 with the document 210 may establish a relationship. The relationship may be indexed in a graph index by a search service.

The relationship may be defined by an edge in the graph index where the tag 208 and the document 210 are nodes. The edge may connect the nodes of the tag 208 and document 210 which establishes the relationship between the nodes. An example edge may include a "taggedwith" edge that describes the document 210 tagged with the tag 208. Another example edge may include a "taggeddoc" edge that describes the tag 208 that is used to tag the document 210.

Figure 3:
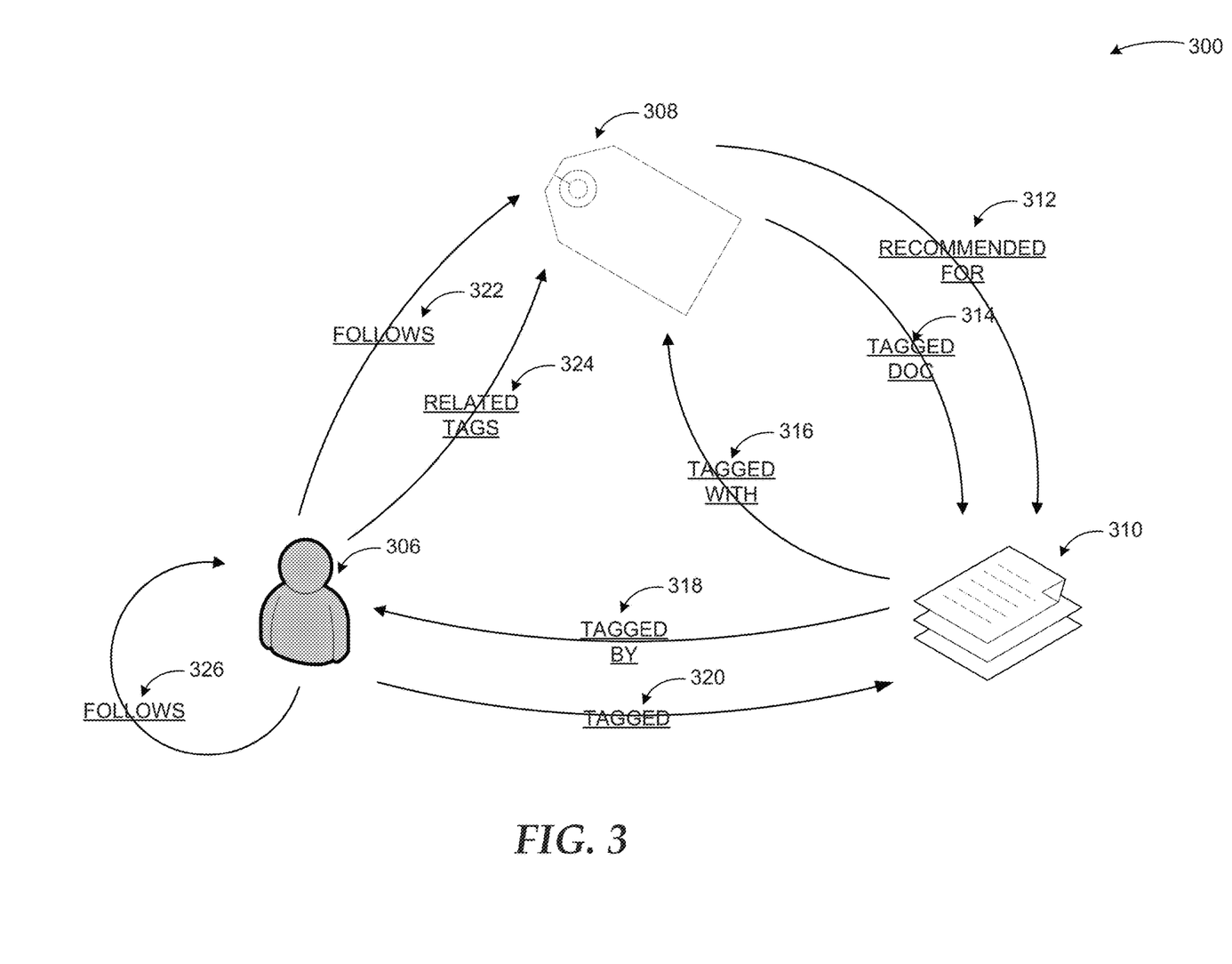
FIG. 3 illustrates detailed view of rapid indexing of document tags, according to embodiments.

FIG. 3 illustrates detailed view of rapid indexing of document tags, according to embodiments.

In a diagram 300, a search service may index a tag 308 and a document 310 in a text based index and a graph index. The tag 308 and the document 310 may be indexed based on relationships with each other and a user 306. The relationships may be described in edges of the graph index where the tag 308, the document 310 and the user 306 may be nodes. The edges may connect the nodes which may establish the relationships. The user 306 may include a person, a computing device, a service, an application, a multitude of each, a combination of each, among others.

Relationships between a tag 308 and a document 310 may be established within the graph index using a "taggedwith" edge 316 and a "taggeddoc" edge 314. The "taggedwith" edge 316 may describe a relationship between the document 310 that is tagged with the tag 308. The "taggeddoc" edge 314 may describe the tag 308 used to tag the document 310. A "recommendedfor" edge 312 may describe the tag 308, for which the document 310 may be recommended. A "tagged" edge 320 may describe the user 306 that tagged the document 310. A "taggedby" edge 318 may describe a document 310 tagged by the user 306. A "follows" edge 326 may describe the user 306 who follows the search service, among other entities such as the tag 308 and the document 310. A "follows" edge 322 may describe the user 306 who follows the tag 308. A "relatedtags" edge 324 may describe a user 306 who has related tags such as the tag 308.

The search service may use a text based index and a graph index to rapidly index document tags. The text based index may include entries for an entity such as a document, a tag, a user, among others. The entries may be searched by the user 306 using text based search queries. The graph index may be used to store information about relationships of entities from the text based index.

The text based index may be searched with a text based query to retrieve entries associated with a document or other entities. Each entry in the text based index may have a unique uniform resource locator (URL) and a unique identifier. The tag 308 may also be added as a tag document to the text based index. In an example scenario, the tag may be assigned with a custom URL in a format that includes: TAG://PUBLIC?NAME=<TAGNAME> to distinguish the tag document from other documents in the text based index. "TAGNAME" variable may be in an upper case format. The "TAGNAME" variable may also be URL encoded.

In an example scenario, a tag such as "Machine learning" and another tag such as "machine learning" may be processed as a single tag. The tag name may also be normalized to remove space characters or punctuation. In another example scenario, a tag such as "machinelearning" and another tag such a "machine learning" may be processed as a single tag. The document 310 may also receive a unique identifier when added to the text based index.

The graph index may store relationships between entities such as the document 310, the tag 308, and the user 306. The entities may be represented as nodes in the graph index, with identifiers. A relationship may be represented as an edge in the graph index. The edge may connect the nodes. The graph index may store relationships between tags and documents from the text based index. An edge may include a type such the "taggeddoc" edge 314, a "taggedwith" edge 316, among others. The "taggedwith" edge 316 may also have a name of the tag 308 as typed by the user 306 so that it may be displayed in an original form on the document 310.

Figure 4:
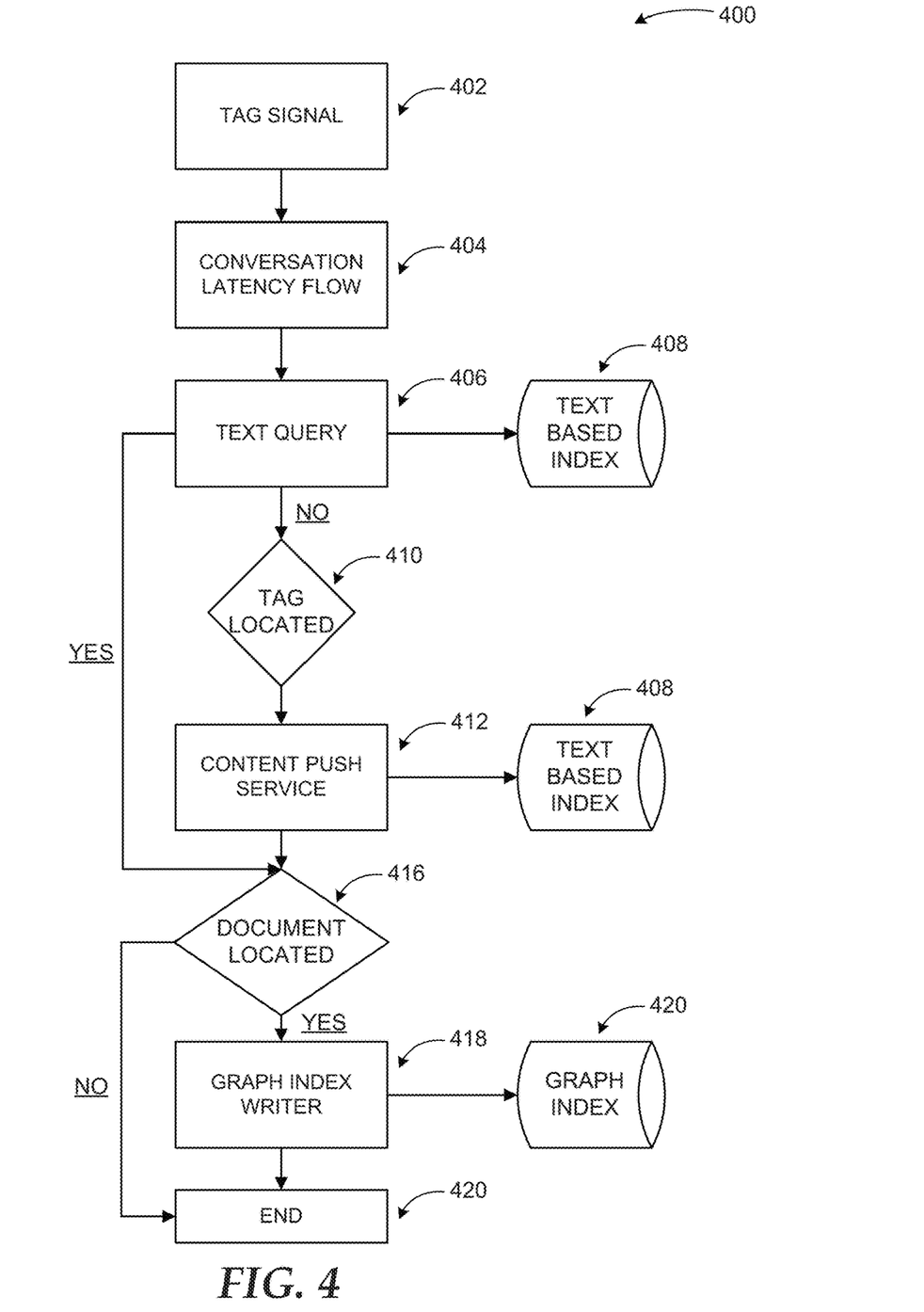
FIG. 4 illustrates a flow diagram of rapid indexing of document tags, according to embodiments.

FIG. 4 illustrates a flow diagram of rapid indexing of document tags, according to embodiments.

In a diagram 400, a search service may initiate a conversation latency flow 404 operation triggered by a tag signal 402. The tag signal 402 may include a tag and a type of the tag. The search service may execute actions on the text based index in response to receiving the tag signal 402. The tag signal may notify the search service of events such as a viewing, a clicking, a liking of a document, among others. The type of the tag may include an add type to add the tag to the document or a delete type to remove the tag from the document. Tags are unique entries in text based index and may be deleted only if there are no other edges in graph between given tag and any other entities in graph except given document. In other words, if a tag 1 is set to a document 1 and a document 2 and a signal is received to delete tag 1 from document 1, relations in graph between tag 1 and document 1 may be deleted, but tag 1 may not be deleted from text based index until a request is received to delete tag 1 from document 2. The tag signal may also include a name of the tag, a URL of a document and information about whether tag is to be added or removed.

An example of the tag signal 402 may include:

```
"signals": [
  {
    "_metadata": {
      "type":
      "Company.DataStore.Client.Search.Analytics.AnalyticsSignal"
    },
    "Actor": {
      "_metadata": {
        "type":
        "Company.DataStore.Client.Search.Analytics.AnalyticsActor"
      },
      "Id": null
    },
    "Action": {
      "_metadata": {
        "type":
        "Company.DataStore.Client.Search.Analytics.AnalyticsAction"
      },
      "ActionType": "Tag",
      "Properties": {
        "results": [
          {
            "_metadata": {
              "type": "SP.KeyValue"
            },
            "Key": "TagName",
            "Value": "MyTag",
            "ValueType": "Edm.String"
          },
          {
            "_metadata": {
              "type": "SP.KeyValue"
            },
            "Key": "TagAction",
            "Value": "Add",
            "ValueType": "Edm.String"
          }
        ]
      }
    },
    "Item": {
      "_metadata": {
        "type": "Company.DataStore.Client.Search.Analytics.AnalyticsItem"
      },
      "Id": "http://www.contoso.com/Shared Documents/Document.docx"
    },
    "Source": "MyApp"
  }
]
}
```

The tag and the type of the tag located in the tag signal 402 may be stored in a data store. The data store may be a persistent data store. The tag and the tag type may be retrieved from the data store in response to a corruption of a text based index 408 or a graph index 420 or a maintenance event that prevents indexing of the tag at the text based index 408 or the graph index 420. The tag may be re-indexed as a tag document at the text based index 408.

The conversation latency flow 404 operation may be initiated by the search service in response to receiving the tag signal 402. The conversation latency flow 404 operation may execute a text query 406 operation to retrieve a unique identifier for the tag and the document associated with the tag from the text based index 408. If the tag is not located through a decision operation 410 in the text based index 408, a content push service 412 may be executed to store the tag as a tag document in the text based index 408. A URL of the tag and the document may also be constructed (or built) and stored in the text based index 408. If the tag is located through the decision operation 410 in the text based index 408 then a decision operation 416 may be executed. The decision operation 416 may detect whether the document associated with the tag is located. In response to detecting the document, an edge between the tag and the document is constructed in the graph index 420 by a graph index writer 418 operation. In response to a failure to detect the document, the conversation latency flow 404 operation is placed in a hold or a waiting pattern for another tag signal to re-initiate the conversation latency flow 404 operation. The operations may be waiting for a document to be indexed, then an analytics job may periodically scan all the signals and populate any new edges that should be added.

The technical effect of rapidly indexing document tags may be enhancements in speed of document tagging and providing updates to tagged documents during outages compared to solutions that fail or pause.

The example scenarios and schemas in FIG. 1 through 4 are shown with specific components, data types, and configurations. Embodiments are not limited to systems according to these example configurations. Rapid indexing of document tags may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
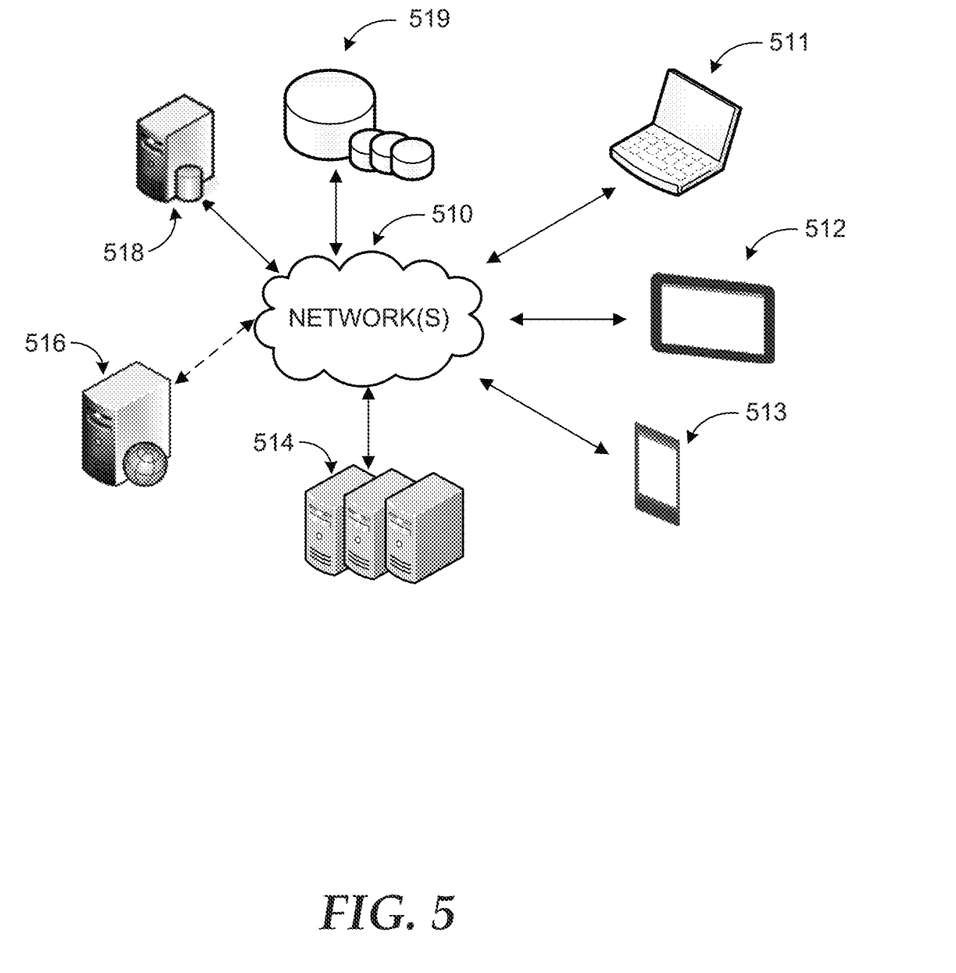
FIG. 5 is a simplified networked environment, where a system according to embodiments may be implemented.

FIG. 5 is an example networked environment, where embodiments may be implemented. A search service configured to rapidly index document tags may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A search service may store a tag and a type of the tag from a tag signal in a data store. The tag may be indexed as tag document in a text based index. Relationships between a content document and the tag may be managed in a graph index. The search service may store data associated with the tag and the document in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to rapidly index document tags. Furthermore, the networked environments discussed in FIG. 5 are for illustration purposes only. Embodiments are not limited to the example applications, modules, or processes.

Figure 6:
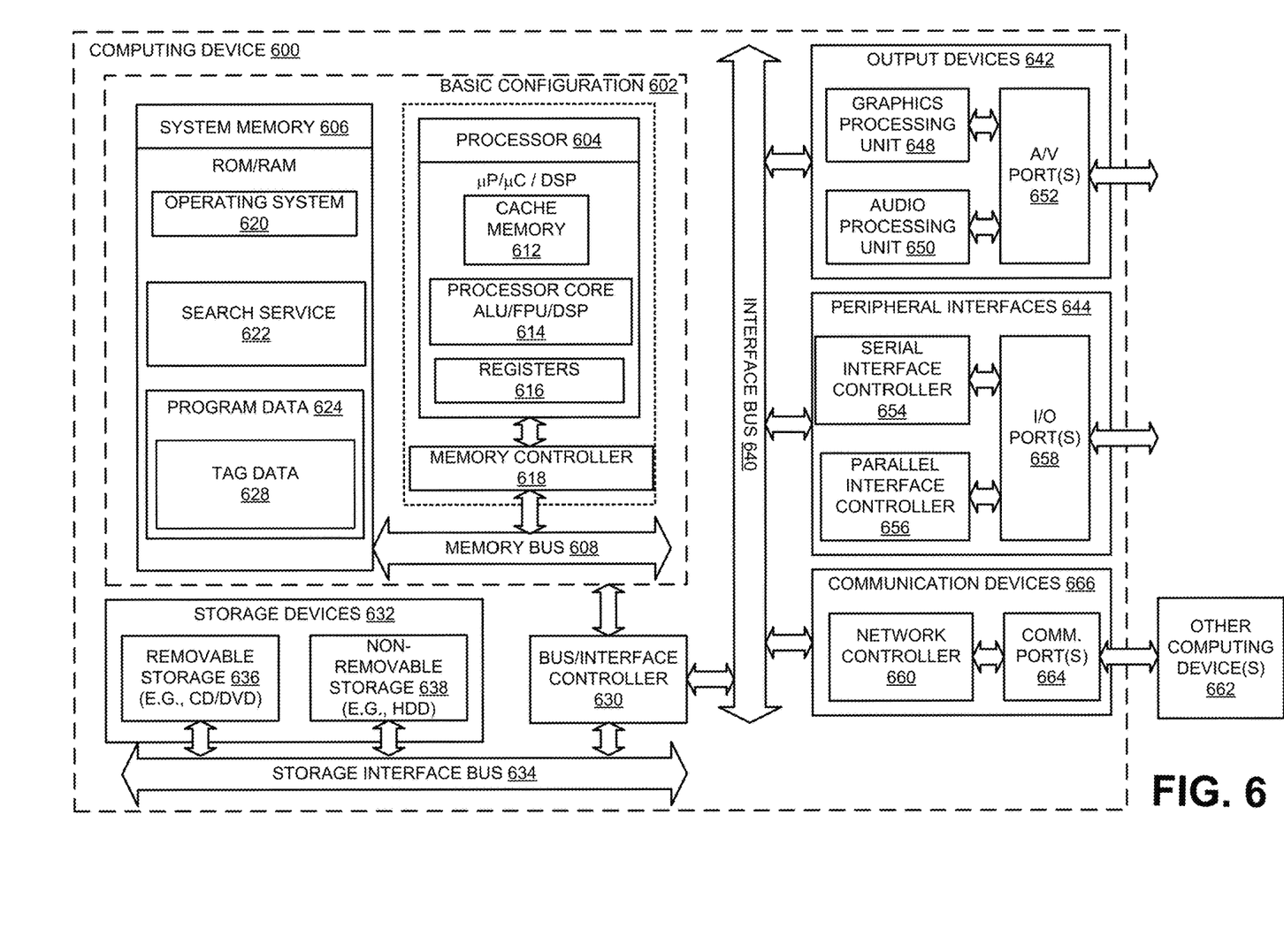
FIG. 6 illustrates a general purpose computing device, which may be configured to rapidly index document tags.

FIG. 6 illustrates a general purpose computing device, which may be configured to rapidly index document tags, arranged in accordance with at least some embodiments described herein.

For example, the computing device 600 may be used to rapidly index document tags. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a search service 622, and a program data 624. The search service 622 may store a tag as a tag document in a text based service. Relationships between the tag and the document may be stored as edges in a graph index. The program data 624 may include, among other data, tag data 628, or the like, as described herein. The tag data 628 may include a unique identifier and a URL associated with the tag.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include rapid indexing of document tags. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
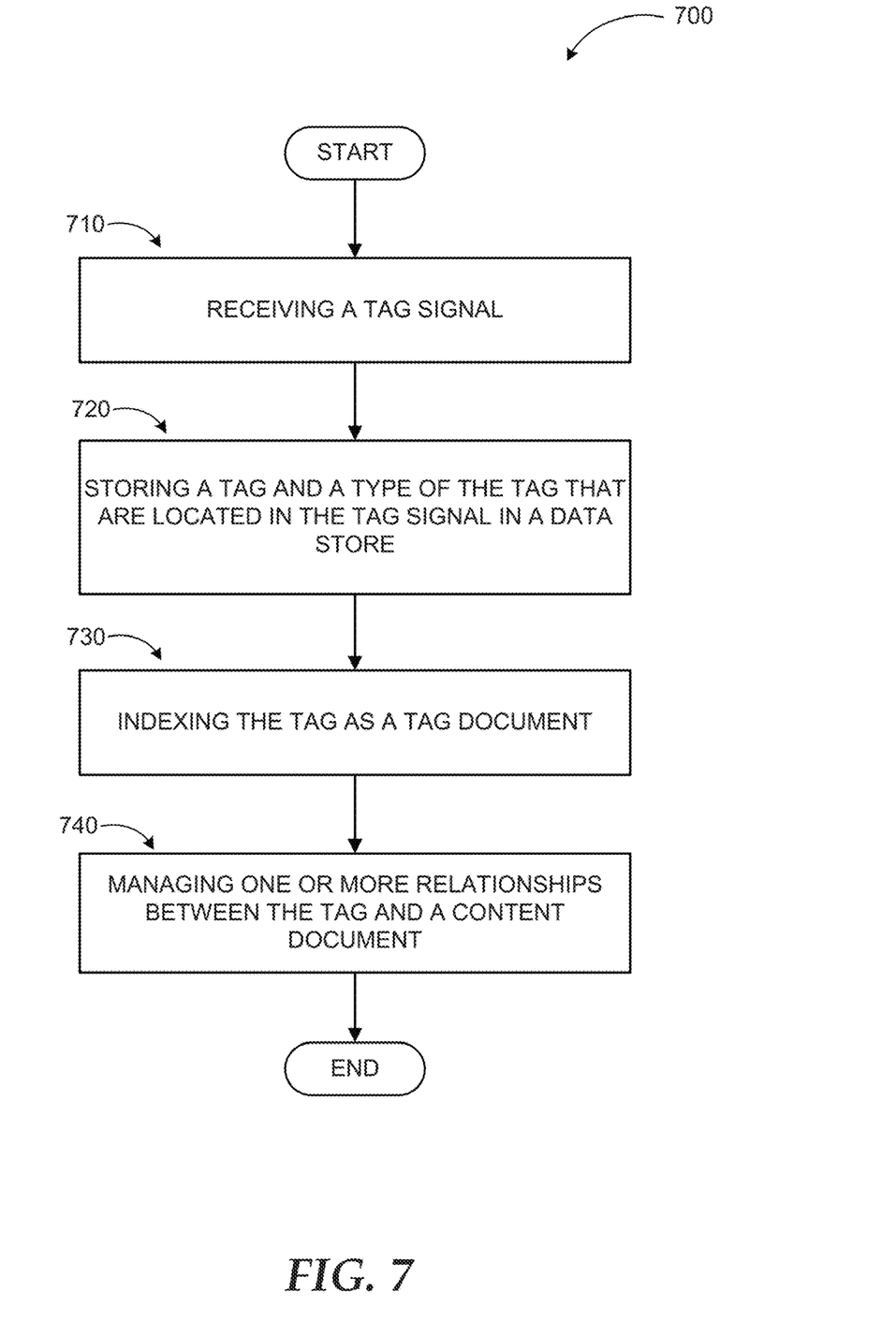
FIG. 7 illustrates a logic flow diagram for a process to rapidly index document tags, according to embodiments.

FIG. 7 illustrates a logic flow diagram for a process rapidly index document tags, according to embodiments. Process 700 may be implemented on a search service.

Process 700 begins with operation 710, where a tag signal may be received. A tag and a type of the tag that are located in the tag signal may be stored in a data store at operation 720. At operation 730, the tag may be indexed as a tag document in a text based index. One or more relationships between the tag and a content document may be managed in a graph index at operation 740.

The operations included in process 700 are for illustration purposes. A search service according to embodiments may be implemented by similar processes with fewer or additional steps, as well as in different order of operations using the principles described herein.

According to some examples, a method that is executed on a computing device to rapidly index document tags may be described. The method may include receiving a tag signal, storing a tag and a type of the tag that are located in the tag signal, in a data store, indexing the tag as a tag document, and managing one or more relationships between the tag and a content document.

According to other examples, the method may further include retrieving the tag from the data store in response to one or more from a set of: a corruption of an index associated with the tag and a maintenance event that prevented indexing of the tag and re-indexing the tag as the tag document. The same process may also be used when the document is not in the index when the tag signal is received. In response to a detection that the type is an add type, an action to add the tag into a text based index and a graph index may be initiated. In response to a detection that the type is a delete type, an action to delete the tag from a text based index and a graph index may be initiated. A text query to locate the tag in a text based index may be executed. In response to a detection of the tag in the text based index, the text based index may be searched for the content document associated with the tag. In response to a failure to detect the tag in the text based index, the tag may be stored as the tag document in the text based index.

According to further examples, the method may further include searching a text based index for the content document associated with the tag. In response to a detection of the content document in the text based index, a relationship between the tag and the content document may be stored as an edge in a graph index for the tag type that is an add type. In response to a detection of the content document in the text based index, a relationship between the tag and the content document may be removed as an edge in a graph index for the tag type that is a delete type. In response to a failure to detect the content document in the text based index, another tag signal may be waited for in order to index another tag and another document in a text based index and a graph index that stores relationships between the other tag and the other document.

According to some examples, a computing device to rapidly index document tags may be described. The computing device may include a memory, a processor coupled to the memory. The processor may be configured to execute a search service in conjunction with instructions stored in the memory. The search service may be configured to receive a tag signal, store a tag and a type of the tag that are located in the tag signal, in a data store, index the tag as a tag document in a text based index, and manage one or more relationships between the tag and a content document.

According to other examples, the search service is further configured to retrieve a unique identifier for the tag from the text based index, construct a tag uniform resource locator (URL) for the tag using the unique identifier, and store the tag document with the tag URL in the text based index to distinguish the tag document from the content document. The tag type may be detected as an add tag type and a "taggeddoc" edge may be added into a graph index to establish a relationship describing the tag used to tag the document. The tag type may be detected as a delete tag type and a "taggeddoc" edge may deleted from a graph index to remove a relationship describing the tag used to tag the document. In response to a detection that the tag type is an add tag type, a "taggedwith" edge may be added into a graph index to establish a relationship describing the document as tagged with the tag and in response to a detection that the tag type is a delete tag type, another "taggedwith" edge may be deleted from a graph index to remove another relationship describing the document as tagged with the tag According to some examples, a computer-readable memory device with instructions stored thereon to rapidly index document tags may be described. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to rapidly index document tags, the method comprising:

receiving, at the computing device, data representing a tag signal containing a tag and a tag type associated with the tag, the tag being representable by a node in a graph based index having one or more additional nodes representing individual content items and users interconnected with one another and to the node corresponding to the tag via individual edges, wherein:

the tag contains data representing a user interaction of one of the users represented by one of the nodes in the graph based index with one of the content items stored in a computer network and represented by another node in the graph based index; and the tag type contains data indicating an addition of the node representing the tag to the graph based index to be connected to the another node representing the one of the content items via an edge, or deletion of the node representing the tag from being connected to the another node representing one of the content items in the graph based index;

storing the tag and the associated tag type contained in the tag signal, in a persistent data store on the computer network;

indexing the tag containing the data representing the user interaction with the one of the content items as a tag document in a text based index that also references the one of the content items represented by the another node in the graph based index; and modifying one or more relationships between the node representing the tag and the another node representing the one of the content items in the graph based index according to the tag type containing the data indicating an addition of the node representing the tag to be connected to the another node representing the one of the content items via the edge or from being disconnected to the another node representing the one of the content items in the graph-based index.

2. The method of claim 1, further comprising:
retrieving the tag from the data store in response to one or more of a corruption of the text based index associated with the tag, a maintenance event that prevented indexing of the tag in the text based index, or the one of the content items referenced in the tag signal appearing in the text based index; and
re-indexing the tag as a tag document in the text based index based on the retrieved tag.

3. The method of claim 1, further comprising:
determining whether the tag type is an addition type; and
in response to determining that the type is an addition type, adding the tag into the graph based index.

4. The method of claim 1, further comprising:
determining whether the tag type is a deletion type; and
in response to determining that the tag type is a deletion type, deleting the tag from the graph based index.

5. The method of claim 1, further comprising:
executing a text query to locate the tag in the text based index.

6. The method of claim 1, further comprising:
in response to a detection of the tag in the text based index, searching the text based index for the one of the content items associated with the tag.

7. The method of claim 6, further comprising:
in response to a failure to detect the tag in the text based index, storing the tag as the tag document in the text based index.

8. The method of claim 1, further comprising:
searching the text based index for the one of the content items corresponding to the tag.

9. The method of claim 8, further comprising:
in response to a detection of the one of the content items in the text based index, storing a relationship between the tag and the one of the content items as an edge in the graph based index when the tag type is an addition type.

10. The method of claim 8, further comprising:
in response to a detection of the one of the content items in the text based index, removing a relationship between the tag and the one of the content items as an edge in the graph based index when the tag type is a deletion type.

11. The method of claim 1, further comprising:
in response to a failure to detect the one of the content items in the text based index, waiting for the one of the content items to appear in the text based index.

12. A computing device to rapidly index document tags, the computing device comprising:
a memory;
a processor coupled to the memory, the processor executing a search service in conjunction with instructions stored in the memory, wherein the search service is configured to:
receive, at the computing device, a tag signal via a computer network, the tag signal containing:
a tag containing data representing a user interaction by a user with a content item accessible via the computer network, the tag being representable by a node in a graph based index having another node representing the content item and a further node representing the user both individually connectable to the node corresponding to the tag via an edge; and
a corresponding tag type containing data indicating an addition of the node representing the tag to the graph based index to be connected to the another node representing the content item or the further node representing the user via the edge or from being connected to the another node representing the content item in the graph-based index;
determine whether the tag already exists in a text based index;
in response to determining that the tag does not exist in the text based index that also references the content item corresponding to the another node in the graph based index, add the tag as a tag document in the text based index; and
update one or more relationships between the node representing the tag and the another node representing the content item in the graph-based index based on data contained in the corresponding tag type in the tag signal.

13. The computing device of claim 12, wherein the search service is further configured to:
in response to determining that the tag does exist in the text based index,
retrieve a unique identifier for the tag from the text based index; and
construct a uniform resource locator (URL) for the tag document using the retrieved unique identifier.

14. The computing device of claim 13, wherein the search service is further configured to:
store the tag document with the constructed URL in the text based index to distinguish the tag document from the item.

15. The computing device of claim 12, wherein the search service is further configured to:
detect the tag type in the tag signal as an addition type; and
in response, add a "taggeddoc" edge into the graph index to establish a relationship describing that the tag is used to describe the item.

16. The computing device of claim 12, wherein the search service is further configured to:
detect the tag type as a deletion type; and
in response, delete a "taggeddoc" edge from the graph index to remove a relationship describing that the tag used to tag the item.

17. The computing device of claim 12, wherein the search service is further configured to:
in response to a detection that the tag type is an addition type, add a "taggedwith" edge into the graph index to establish a relationship describing that the content item is associated with the tag; and
in response to a detection that the tag type is a deletion type, delete another "taggedwith" edge from the graph index to remove another relationship describing that the content item was associated with the tag.

18. A method executed on a computing device to rapidly index tags associated with content documents, the method comprising:
receiving, at the computing device and via a computer network, data representing a tag signal containing:
an identification of a content document;
a tag containing data representing a user interaction by a user with the content document, the user interaction including one or more of viewing, clicking, or liking the content document, the tag being representable by a node in a graph based index having another node representing the content document with the identification and a further node representing the user individually connectable to the node corresponding to the tag via an edge; and a tag type containing data indicating an addition of the node representing the tag to the graph based index to be connected to the another node representing the content item via the edge or a deletion of the node representing the tag from being connected to the another node representing the content document in the graph based index;

determining whether the tag and the content document already exist in a text based index;

in response to determining that the tag and the content document exist in the text based index, retrieving, from the text based index, a tag identifier and a document identifier corresponding to the tag and the content document, respectively; and using the retrieved tag identifier and the document identifier, modifying a relationship between the node representing the tag and the another node representing the content document in the graph based index according to the tag type containing the data indicating an addition of the node representing the tag to the graph based index to be connected to the another node representing the content item via the edge or a deletion of the node representing the tag from being connected to the another node representing the content document in the graph-based index.

19. The method of claim 18, further comprising:

in response to determining that the tag does not exist in the text based index, creating an entry corresponding to the tag in the text based index, the created entry being a tag document; and constructing the tag identifier corresponding to the tag document in the text based index.

20. The method of claim 18 wherein the tag identifier and the document identifier individually include a universal resource locator accessible via the computer network.

\* \* \* \* \*